US012695609B2

(12) United States Patent　　　　　(10) Patent No.:　US 12,695,609 B2

Niu et al.　　　　　　　　　　　　　　(45) Date of Patent:　　　Jul. 28, 2026

---

(54) UNBALANCED PRIVATE SET INTERSECTION PROTOCOLS ON SOCIAL MEDIA PLATFORMS

(71) Applicants: Lemon Inc., Grand Caymon (KY); Beijing Zitiao Network Technology Co., Ltd., Beijing (CN)

(72) Inventors: Yongchuan Niu, Beijing (CN); Chuyuan Chen, Shanghai (CN); Shengjun Zhong, Shanghai (CN); Yonghao Yi, Hangzhou (CN); Brendon Lim Chee How, Singapore (SG); Li Wang, Hangzhou (CN); Qiang Yan, Shanghai (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 128 days.

(21) Appl. No.: 18/677,196

(22) Filed: May 29, 2024

(65) Prior Publication Data

US 2025/0317287 A1　　　Oct. 9, 2025

Related U.S. Application Data

(63) Continuation of application No. PCT/CN2024/086882, filed on Apr. 9, 2024.

(51) Int. Cl.
H04L 9/08　　　　　(2006.01)

(52) U.S. Cl.
CPC ................................... H04L 9/088 (2013.01)

(58) Field of Classification Search
CPC ................................ H04L 9/008; H04L 9/088
See application file for complete search history.

(56) References Cited

U.S. PATENT DOCUMENTS

| | | | |
|---|---|---|---|
| 11,444,755 B2 * | 9/2022 | Christensen | H04L 9/14 |
| 2013/0246802 A1 * | 9/2013 | Kerschbaum | H04L 9/00 |
| | | | 713/189 |

(Continued)

FOREIGN PATENT DOCUMENTS

| | | |
|---|---|---|
| CN | 112507362 A | 3/2021 |
| CN | 115004559 A | 9/2022 |

OTHER PUBLICATIONS

International Search Report and Written Opinion for International Application No. PCT/CN2024/086882 , mailed Dec. 23, 2024, 7 Pages.

*Primary Examiner* — Eric W Shepperd
(74) *Attorney, Agent, or Firm* — Fish & Richardson P.C.

(57)　　　　　　　ABSTRACT

The implementations provide a method including: encrypting records on one or more computing devices using a key of the one or more computing devices to generate a first set of encrypted records; preparing a matrix indicating that each of the first set of encrypted records is present on the one or more computing devices; responsive to receiving, from a remote device, a second set of encrypted records encrypted by the second device using a key of the remote device, encrypting the second set of encrypted records using the key of the one or more computing devices; and transmitting the second set of doubly encrypted records, along with the matrix, to the remote device for the remote device to determine, using the matrix, whether at least one of the second set of encrypted records of the second device is included in the first set of encrypted records on the first device.

20 Claims, 5 Drawing Sheets

(56) References Cited

U.S. PATENT DOCUMENTS

| | | | |
|---|---|---|---|
| 2014/0052999 A1 | 2/2014 | Aissi et al. | |
| 2015/0149763 A1* | 5/2015 | Kamara | H04W 4/02 |
| | | | 713/150 |
| 2015/0286825 A1* | 10/2015 | Freudiger | H04L 9/0637 |
| | | | 726/26 |
| 2016/0204933 A1 | 7/2016 | Ronchi et al. | |
| 2018/0367293 A1* | 12/2018 | Chen | H04L 9/30 |
| 2021/0194856 A1* | 6/2021 | Laine | H04L 9/0643 |
| 2021/0234689 A1* | 7/2021 | Song | G06F 21/6245 |
| 2022/0004654 A1* | 1/2022 | Patel | G06F 21/602 |
| 2022/0078023 A1* | 3/2022 | Nicolas | G06F 21/602 |
| 2022/0103534 A1* | 3/2022 | Sato | H04L 9/3013 |
| 2023/0401331 A1* | 12/2023 | Xu | G06F 21/6254 |
| 2024/0143795 A1* | 5/2024 | Zhou | G06F 21/6245 |
| 2024/0330485 A1* | 10/2024 | Yeo | G06F 21/602 |
| 2024/0386020 A1* | 11/2024 | Badrinarayanan | H04L 9/0841 |

* cited by examiner

UNBALANCED PRIVATE SET INTERSECTION PROTOCOLS ON SOCIAL MEDIA PLATFORMS

CROSS-REFERENCE TO RELATED APPLICATIONS

This application claims priority under 35 U.S.C. § 120 to the Patent Cooperation Treaty Application Serial No. PCT/CN2024/086882, filed on Apr. 9, 2024, the entire contents of which are hereby incorporated by reference.

TECHNICAL FIELD

This specification generally relates to protecting data privacy of parties during online communication sessions.

BACKGROUND

A social media platform can connect its users by presenting the users with a selection of their existing address book contacts who are registered with the social media platform. For example, the social media platform can provide a messaging application installed on a user device such as a mobile phone. The user of the user device may allow the messaging application to access the contacts stored on the user device. This convenient feature may also be known as mobile contact discovery, which attempts to match users' contact lists with the service's database. The address book of each user can also be checked regularly to provide an up-to-date list of possible contacts. However, some contact discovery implementations may put the users' privacy at risk. For example, some implementations were found to obtain their users' contact lists in plaintext. For those implementations that use hashing-based encryptions, these implementations are vulnerable to brute-force attacks.

SUMMARY

In one aspect, some implementations provide a computer-implemented method comprising: generating, at one or more first devices, a first plurality of encrypted records by encrypting a first plurality of original records using a cryptographic function driven by a first key generated at the one or more first devices, wherein each encrypted record comprises a sequence of segments; creating a matrix sized to have a first number of rows and a second number of columns, wherein each matrix element in the matrix is a binary entry and initialized as unity; inserting the first plurality of encrypted records into the matrix, wherein inserting one of the encrypted records comprises: for each segment of the encrypted record, identifying a corresponding position in the matrix based on, at least in part, a numerical value of the segment of the encrypted record, and setting a matrix element at the corresponding position in the matrix to zero; responsive to a request from a second device providing a second plurality of encrypted records encrypted by the second device using the cryptographic function driven by a second key generated at the second device, encrypting the second plurality of encrypted records using the cryptographic function driven by the first key to create a second plurality of doubly encrypted records; and transmitting the second plurality of doubly encrypted records and the matrix to the second device, the second device using the second plurality of doubly encrypted records and the matrix to determine whether at least one of the second plurality of encrypted records is included in the first plurality of encrypted records.

The implementations may include one or more of the following features.

The method may further comprise: categorizing the first plurality of encrypted records according to prefixes of the first plurality of original records into a set of groups, each group from the set of groups holding encrypted records whose original records share a prefix; and responsive to the request from the second device further providing a query prefix, identifying a group from the set of groups holding encrypted records whose original records share the query prefix, wherein the encrypted records of the group are inserted into the matrix for transmitting to the second device. The prefix may be sized to be at least one bit in length. The transmitting causes the second device to determine whether at least one encrypted record from the second plurality of encrypted records is included in the first plurality of encrypted records by: for each segment of the at least one encrypted record, identifying a corresponding position in the matrix based on, at least in part, a numerical value of the segment, and determining whether the matrix element at the corresponding position is valued at zero; and responsive to determining that all matrix elements at corresponding positions for the segments of the at least one encrypted record have a value of zero, determining that the at least one encrypted record from the second plurality of encrypted records is included in the first plurality of encrypted records. The matrix may be configured sufficiently large such that a probability of one or more of the matrix elements valued to be non-zero is below a pre-determined threshold. The cryptographic function comprises a cryptographically secure oblivious pseudorandom function (OPRF) based on elliptic curve cryptography, wherein said encrypting generates, for each original record, a corresponding encrypted record at a bit length that is configurable, and wherein each original record encodes phone contact information. The bit length may be configured at a size determined by a product of the first number and the second number. The first number and the second number may be adjustable to accommodate a size of the first plurality of encrypted records, and wherein the second plurality of encrypted records are substantially smaller in number than the first plurality of encrypted records. The sequence of segments for each encrypted record may correspond to a number of segments that equals to the second number, wherein each segment has a bit length determined by the first number, and wherein each segment corresponds to a row in the matrix. When inserting an encrypted record comprising the sequence of segments, the corresponding position in the matrix for the matrix element is identified by: a row index that corresponds to a sequential index in the sequence of segments for the encrypted record, and a column index the corresponds to a numerical value of a segment at the sequential index in the sequence of segments.

In another aspect, some implementations provide one or more computer-readable storage media encoded with instructions that, when executed by one or more computers, cause the one or more computers to perform operations comprising: generating a first plurality of encrypted records by encrypting a first plurality of original records using a cryptographic function driven by a first key generated at the one or more computers, wherein each encrypted record comprises a sequence of segments; creating a matrix sized to have a first number of rows and a second number of columns, wherein each matrix element in the matrix is a binary entry and initialized as unity; inserting the first plurality of encrypted records into the matrix, wherein inserting one of the encrypted records comprises: for each segment of the encrypted record, identifying a corresponding position in the matrix based on, at least in part, a numerical value of the segment of the encrypted record, and setting a matrix element at the corresponding position in the matrix to zero; responsive to a request from a remote device providing a second plurality of encrypted records encrypted by the remote device using the cryptographic function driven by a second key generated at the remote device, encrypting the second plurality of encrypted records using the cryptographic function driven by the first key; and transmitting the second plurality of doubly encrypted records and the matrix to the remote device for the remote device to determine whether at least one of the second plurality of encrypted records is included in the first plurality of encrypted records.

The implementations may include one or more of the following features.

The operations may further include: categorizing the first plurality of encrypted records according to prefixes of the first plurality of original records into a set of groups, each group from the set of groups holding encrypted records whose original records share a prefix; and responsive to the request from the remote device further providing a query prefix, identifying a group from the set of groups holding encrypted records whose original records share the query prefix, wherein the encrypted records of the group are inserted into the matrix for transmitting to the remote device. The prefix may be sized to be at least one bit in length. The transmitting may cause the remote device to determine whether at least one encrypted record from the second plurality of encrypted records is included in the first plurality of encrypted records by: for each segment of the at least one encrypted record, identifying a corresponding position in the matrix based on, at least in part, a numerical value of the segment of the encrypted record, and determining whether the matrix element at the corresponding position is valued at zero; and responsive to determining that all matrix elements at corresponding positions for the segments of the at least one encrypted record have a value of zero, determining that the at least one encrypted record from the second plurality of encrypted records is included in the first plurality of encrypted records. The matrix may be configured sufficiently large such that a probability of one or more of the matrix elements valued to be non-zero is below a predetermined threshold. The cryptographic function may include a cryptographically secure oblivious pseudorandom function (OPRF) based on elliptic curve cryptography, wherein said encrypting generates, for each original record, a corresponding encrypted record at a bit length that is configurable, and wherein each original record encodes phone contact information. The bit length may be configured at a size determined by a product of the first number and the second number. The first number and the second number may be adjustable to accommodate a size of the first plurality of encrypted records, and wherein the second plurality of encrypted records are substantially smaller in number than the first plurality of encrypted records. The sequence of segments for each encrypted record may correspond to a number of segments that equals to the second number, wherein each segment has a bit length determined by the first number, and wherein each segment corresponds to a row in the matrix. When inserting an encrypted record comprising the sequence of segments, the corresponding position in the matrix may be identified by: a row index that corresponds to a sequential index in the sequence of segments for the encrypted record, and a column index the corresponds to a numerical value of a segment at the sequential index in the sequence of segments.

In yet another aspect, some implementations provide a computer system comprising one or more computer processors configured to perform operations of: generating a first plurality of encrypted records by encrypting a first plurality of original records using a cryptographic function driven by a first key, wherein each encrypted record comprises a sequence of segments; creating a matrix sized to have a first number of rows and a second number of columns, wherein each matrix element in the matrix is a binary entry and initialized as unity; inserting the first plurality of encrypted records into the matrix, wherein inserting one of the encrypted records comprises: for each segment of the encrypted record, identifying a corresponding position in the matrix based on, at least in part, a numerical value of the segment of the encrypted record, and setting a matrix element at the corresponding position in the matrix to zero; responsive to a request from a remote device providing a second plurality of encrypted records encrypted by the remote device using the cryptographic function driven by a second key generated at the remote device, encrypting the second plurality of encrypted records using the cryptographic function driven by the first key to generate a second plurality of doubly encrypted records; and transmitting the second plurality of doubly encrypted records and the matrix to the remote device for the remote device to determine whether at least one of the second plurality of encrypted records is included in the first plurality of encrypted records Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented in particular embodiments so as to realize one or more of the following advantages. First, some implementations incorporate novel unbalanced private set intersection (PSI) protocols in real-time communication between a user device and a server computer for handling real-world databases on the server computer that store records for very large numbers (e.g., hundreds of millions, billions, or more) of registered users. Second, some implementations also incorporate probabilistic data structures to provide approximate answers, rather than exact answers based on an exhaustive search of the full record. The probabilistic data structure can improve computational speed and reduce storage overhead with no compromise to the computational output. Third, some implementations incorporate bucketization techniques streamline data communication so that queries can be handled with reduced storage and communication overhead, thus improving the operation of the underlying communication network.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1A:
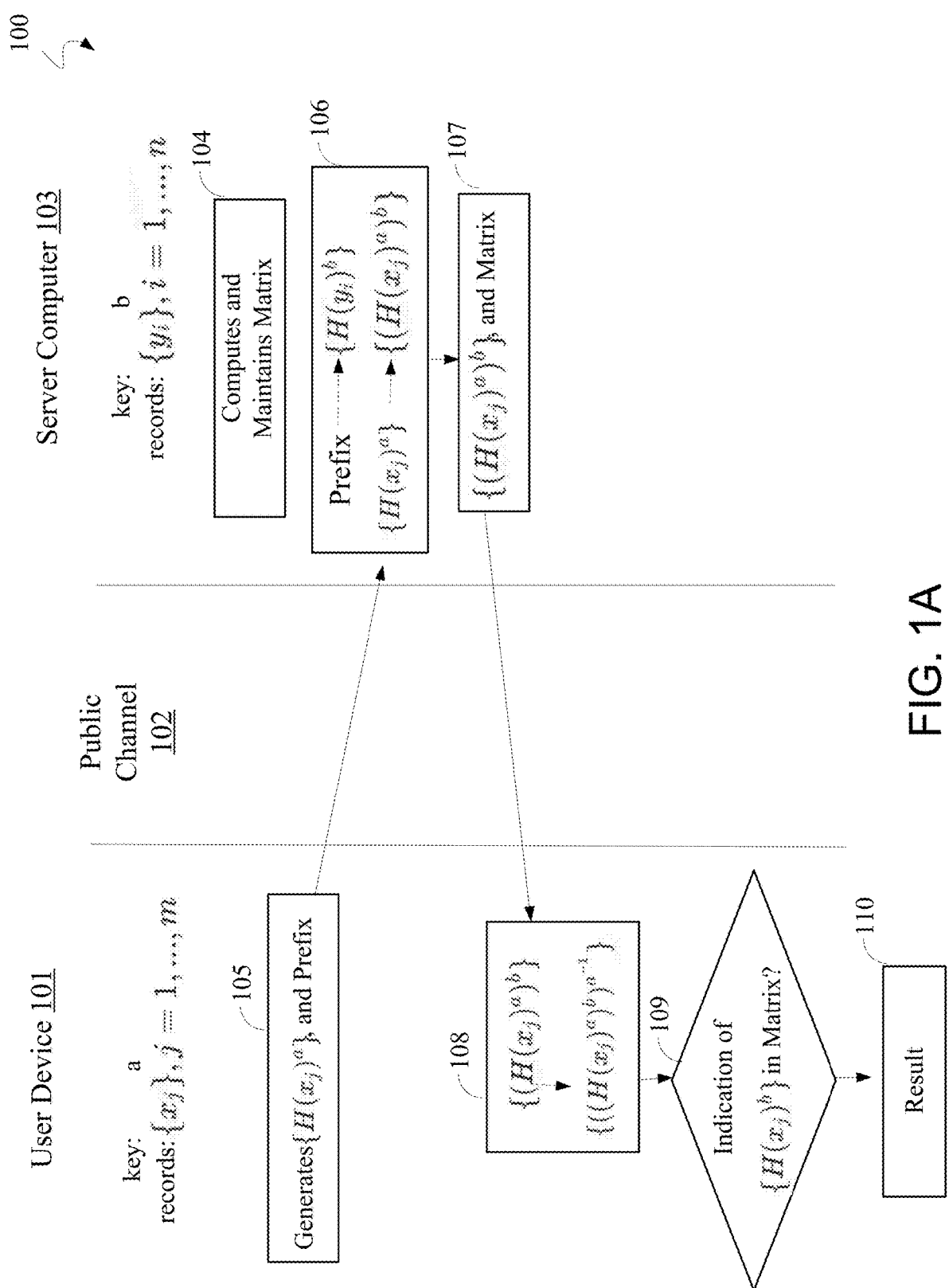
FIG. 1A illustrates an example of a workflow diagram between a user device and a server computer.

The disclosed technology is directed to protecting data privacy on various online platforms, e.g., for social networking, e-commerce, or relationship management. For example, during contact discovery, the messaging apps (e.g., mobile apps on user devices), through the social media platform (e.g., the server providing the platform service), can help users identify existing contacts of the user that have created accounts on the same service offered by the social media platform. Such contact discovery may leak sensitive information in that the server may obtain contact information held by the user device while the user may glean information of other users who signed up for the service. The implementations of the present specification provide unbalanced private set intersection (PSI) protocols. The PSI protocols enable mobile private contact discovery using cryptography and probabilistic data structures in a manner that strikes a tradeoff between security and performance, thereby handling real-world databases that store records for large numbers (e.g., hundreds of millions, billions, or more) of registered users. In short, the implementations address the technical challenge of protecting data privacy that is unique to a modern platform digitally interconnecting the overwhelming number of registered users.

The technology may include the following salient features as part of a solution to the technical challenge. These salient features improve the operation of the underlying computing and communication infrastructure. Some implementations may incorporate an oblivious Pseudorandom Function (OPRF) in a two-party real-time communication protocol for computing the output of a Pseudorandom Function (PRF) in which one party (e.g., a server) holds the PRF secret key, and the other party (e.g., a client) holds the PRF input so that the server does not learn the actual contents of the client's input while the client does not learn about the actual contents of the server's PRF key. For example, the implementations may use Elliptic Curve Diffie-Hellman (ECDH)-based Oblivious Pseudorandom Function, which a cryptographic protocol that combines the principles of Oblivious Pseudorandom Functions (OPRFs) with the security properties of Elliptic Curve Diffie-Hellman (ECDH) key exchange.

Some implementations described in this specification also incorporate probabilistic data structures that provide approximate answers to queries about a large dataset, rather than exact answers. By judiciously designing a probabilistic data structure to test whether an element is a member of a set, the implementations can handle large amounts of data in real-time and achieve a practical trade-off between accuracy and efficiency (e.g., as measured in computation time and storage space). For example, in addition to using the Bloom Filter and Cuckoo Filter, the implementations can incorporate a matrix filter to detect if an element is in a certain set.

Further, some implementations employ bucketization techniques to group encrypted records with the same hash prefix into the same bucket so that only relevant buckets with hash prefixes matching a client inquiry need to be included in subsequent computations and communications. For example, the matrix filter can be condensed when only the relevant buckets are factored in the evaluation. More details of these salient features are provided below with references to FIGS. 1A through 4.

Referring to FIG. 1A, diagram 100 shows an example of a workflow diagram between a user device 101 and a server computer 103 through a public channel 102. Although FIG. 1A provides an example of a device-server architecture, other architectures can be used to implement the technologies described in this specification. For example, the server 103 can be one or more first devices. In addition to a single server computer, the second device can include multiple computers, multiple servers, or other communicatively coupled computing devices including distributed and cloud based computing devices. The user device 101 can be a second device corresponding to a computer, mobile phone, tablet or other computing device. In the illustrated client-server architecture of FIG. 1A, when user device 101 sends requests to server computer 102, server computer 102 may distribute tasks or computations among the available computational resources based on factors like resource availability, workload balancing, and optimization objectives. Examples of distributed computing scenarios can include distributed data processing, distributed storage systems, and distributed computing clusters. In an example of distributed processing, large volumes of data are processed across multiple computing nodes or servers simultaneously, which generally involves parallelization of data processing tasks to allow for faster data analysis, querying, and computation. In another example of distributed storage systems, server computer 102 may replicate and distribute data across multiple storage nodes to allow for fault tolerance, scalability, and high availability. Here, data is typically partitioned and distributed across the storage nodes, and redundancy mechanisms such as replication or erasure coding are employed to protect against data loss. Examples of distributed computing clusters may include interconnected computing nodes on an inter-node high-speed network to execute computational tasks in parallel. User device 101 includes a first key, e.g., key a. The first key can be generated by the user device 101 or obtained from another source. In some implementations, key a can be an elliptic curve key. Other forms of encryption can also be used, such as, for example, RSA (Rivest-Shamir-Adleman) keys. User device 101 also holds first records $\{\kappa_j\}$, $j=1 \ldots$, m. The records can be, for example, contact records, such as phone contact records, email contact records, nickname records, and hashtag records. The records are private records of user device 101, the contents of the private records may not be shared with a third-party including, for example, server computer 103 even though server computer 103 and user device 101 are openly communicating through public channel 102, for example, when user on user device 101 launches a messaging app to share video with other users.

For a given cryptographic hash function, H, and the key a, the user device can encrypt the records $\{x_j\}$, j=1, . . . , m to generate encrypted records $\{H(x_j)^a\}$, j=1, . . . , m, along with the corresponding prefixes (105). In this notation, the cryptographic hash function, H, first hashes the record to obtain $H(x_j)$ and then encrypts each hashed record using key a, which generates a ciphertext, i.e., a bit string of what appears to be a random and indecipherable string of bit values. Key a can be an elliptic curve key or an RSA key generated by user device 101. The corresponding prefixes refer to the starting bits of the encrypted records. The number of these starting bits can vary depending on the particular implementation. The encrypted records $\{H(x_j)^a\}$, j=1, . . . , m, along with the corresponding prefixes (shown as array 115 in FIG. 1B) may be transmitted through public channel 102 to the server computer 103.

Server computer 103 includes a second key, e.g., key b. The second key can be generated by the server computer 103 or obtained form another source. In some implementations, key b can also be an elliptic curve key (e.g., based on an elliptic curve different than the one used by user device 101). Server computer 103 holds second records $\{y_j\}$, j=1, . . . , n. The second records can include records from a collection of other users who have signed up for a service associated with the messaging app. The second records can include contact records, such as phone contact records, email contact records, nickname records, and hashtag records. These records are private records of the service, the contents of which may not be shared with users including, for example, user device 101 even though server computer 103 and user device 101 are openly communicating through public channel 102, for example, when user on user device 101 launches a content-sharing app to share video with other users through the service. The content can also include text, image, audio, icon, meme, or emoji.

Server computer 103 may encrypt records $\{y_j\}$, j=1 . . . , n to generate encrypted records $\{H(y_j)^b\}$, j=1, . . . , n where each encrypted record may correspond to a point within a series of points on an underlying elliptic curve for elliptic curve encryption. The server 103 can further maintain a matrix, which operates as a filter that keeps track of which records are on the server (104). For this reason, the matrix may also be referred to as a matrix filter.

One or more implementations may apply a bucketization technique by adding a type of data known as a hash-prefix, which refers to the first x prefix bits of an encrypted value. Notably, the value of x (prefix bit length) can be adjusted as a tradeoff between privacy and efficiency. For example, server computer 103 may obtain the encrypted records $\{H(y_j)^b\}$, j=1, . . . , n based on a given prefix so that using the given prefix, encrypted records with the matching prefix can be obtained from a corresponding bucket. Meanwhile, server computer 103 also encrypts $\{H(x_j)^a\}$ using server key b to generate $\{(H(x_j)^a)^b\}$ (106). This result is thus doubly encrypted using keys a and b.

Figure 1B:
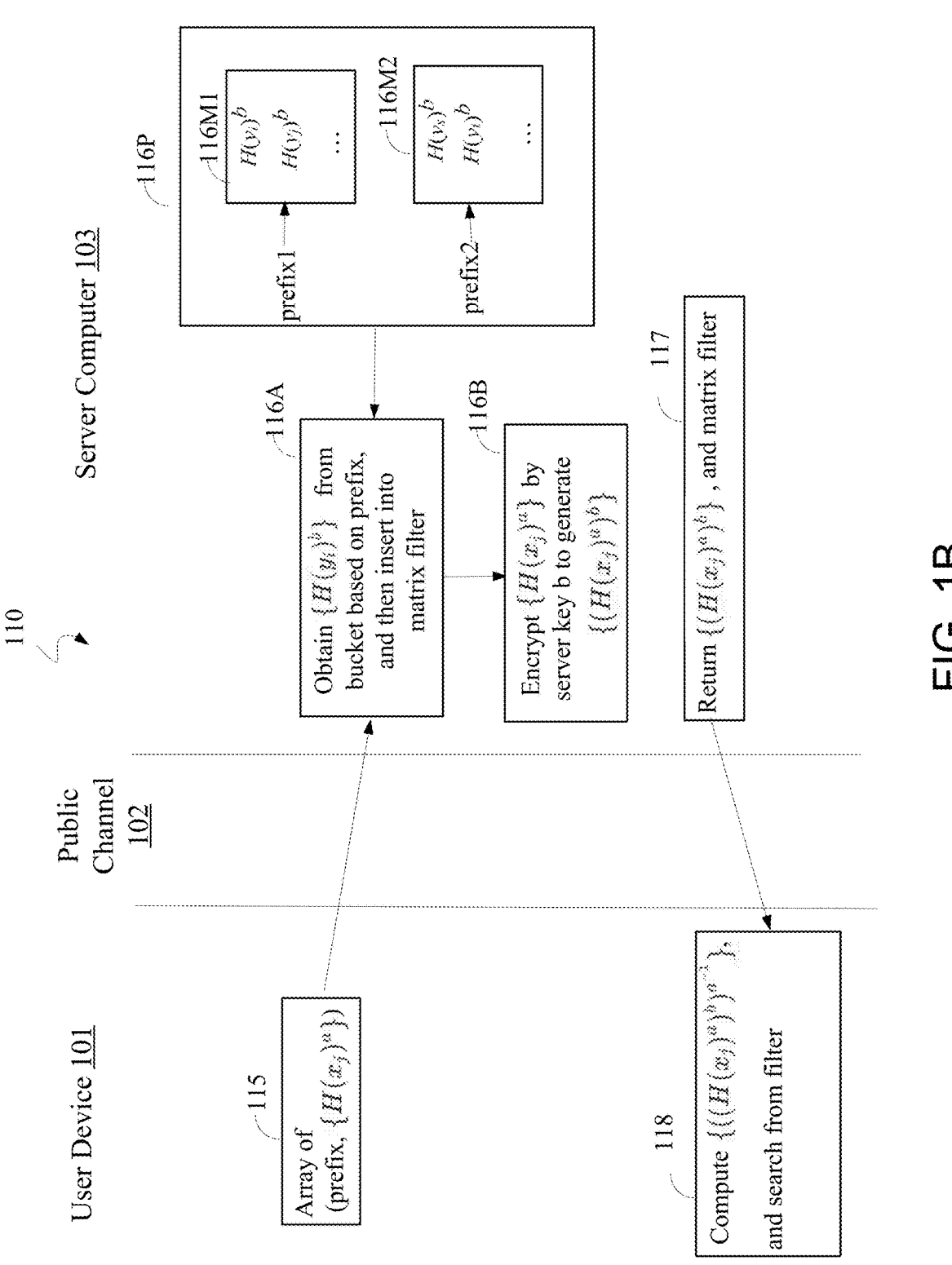
FIG. 1B illustrates additional details of the example of FIG. 1A.

Further referring to FIG. 1B illustrating diagram 110, server computer 103 may initially generate hash prefixes for each of the encrypted records $\{H(y_j)^b\}$, j=1, . . . , n. Server computer 103 may then store each of the encrypted records $\{H(y_j)^b\}$, j=1, . . . , n in a particular bucket according to the hash prefix (116P). For example, a first group of encrypted records, e.g., including $H(y_i)^b$, $H(y_j)^b$, may have the same hash prefix, e.g., prefix1. The first group of encrypted records can then be stored in first bucket 116M 1. Similarly, for a second group of encrypted records, including $H(y_s)^b$, $H(y_t)^b$, having another hash prefix. e.g., prefix 2, the second group of encrypted records are stored in second bucket 116M2. The bit length of the hash prefix can be selected so that the resulting buckets are substantially equal in size. Additionally, or alternatively, some implementations may add dummy datum to one or more buckets so that each bucket contains an equal number of records and the buckets, as stored on the server computer 103, do not reveal information particular about a specific bucket that may be imparted by uneven sizes. Using the bucketization technique, these implementations can strike a tradeoff between privacy (e.g., information concealment associated with larger sized matrices and full-length records) and efficiency (e.g., communication and storage overhead associated with larger sized matrices). In some implementations, the encrypted records are evenly distributed among the buckets, and within each bucket, the encrypted records are indistinguishable from each other. In these implementations, a suitable prefix size is selected so that each bucket is large enough to preserve the sensitive information as private and without leakage. In some implementations, the size of each bucket is on the scale of millions, which can be substantially smaller than the overall set of encrypted records without bucketization. In this manner, the server computer 103 can only detect whether one record from the client with a given prefix is within one of millions of records in the bucket with the given prefix on the server computer.

As illustrated in FIG. 1B, when server computer 103 receives data encoding the prefix and client-encrypted record $\{H(x_j)^a\}$, server computer 103 may obtain server-encrypted data records $\{H(y_i)^b\}$ from a corresponding bucket based on the prefix (116P), and then insert the server-encrypted data records $\{H(y_i)^b\}$ into a matrix filter (116A). In the context of bucketization, the hash prefix used by user device 101 and server computer 103 are the same. The implementations may operate on the results of hashed data records. For simplicity, the original records may also refer to the hashed data records. In some cases, the hash function may project each plain text data record to a uniform bit length, for example, 1024-bit, 2048-bit, and so on. Server computer 103 may then encrypt client-encrypted record $\{H(x_j)^a\}$ using server key b to generate doubly encrypted record $\{(H(x_j)^a)^b\}$ (116B). This operation may also be known as a blind operation. Server computer 103 may then return the doubly encrypted record $\{(H(x_j)^a)^b\}$ and the matrix filter to user device 101 through public channel 102 (117). Upon receipt, user device 101 can perform an unblind operation by computing $\{(H(x_j)^a)^b\}^{a^{-1}}$ (so that $\{(H(x_j)^a)^b\}$ can be decrypted to generate server encrypted version of the user device records, $\{(H(x_j)^b)\}$), and search the matrix filter for an indication of whether the record $x_j$ is present inside the server records of $\{y_j\}$, j=1, . . . , n (118). Details on inserting a record into the matrix filter and searching the matrix for an indication of the record are provided below with reference to FIG. 2.

Returning to FIG. 1A, subsequent to block 106, for transmitting to user device 101, server computer 103 may generate doubly encrypted data records $\{\{(H(x_j)^a)^b\}$, e.g., as illustrated in 116B of FIG. 1B, and generate matrix filter, e.g., as illustrated in 116A of FIG. 1B, (107). Matrix filter 107 is a form of a probabilistic data structure that provide approximate answers, rather than exact answers, to queries about the presence of a record in a large data set (e.g., millions of records or more). The probabilistic data structure, such as the matrix filter, of the implementations are designed to handle large amounts of data in real-time, by striking a tradeoff between accuracy (e.g., low incidence of false negative) and efficiency (e.g., computation time, and storage size). Some implementations leverage probabilistic data structures to test the presence of particular data, e.g., a client-encrypted record inside a set of server-encrypted records, with sufficient precision and real-time response. While the above implementations are described with respect to a matrix filter, other suitable probabilistic data structure can be used, for example, a Bloom filter or a Cuckoo filter.

Figure 2:
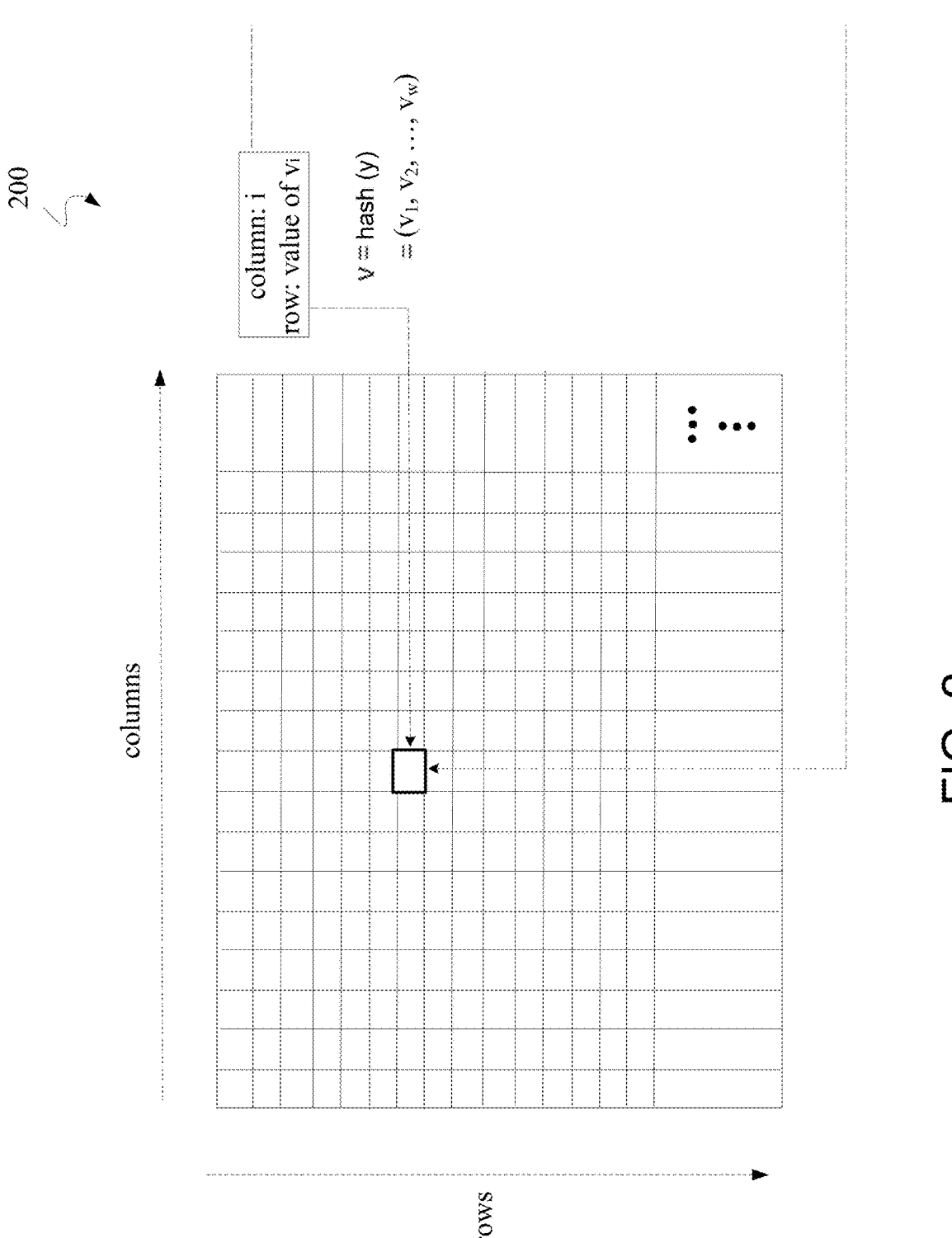
FIG. 2 illustrates an example of setting up a matrix filter according to an implementation of the present disclosure.

The matrix filter of the implementations may include a matrix D having m rows and w columns. Each entry in the matrix is represented as a 1-bit binary value. Each entry can also be referred to as a matrix element. Each matrix entry (or element) has a corresponding position in the matrix, which can be identified by an intersecting pair of a column index and a row index. At initialization, the entries of the matrix (i.e., all matrix elements) are set to unity (1). FIG. 2 illustrates an example of a diagram 200 for inserting a record into the matrix. For a data record of y to be inserted, the data record is encrypted as: $v=H(y)$, where H is generic encryption function, and v is the encryption results represented in a sequence of bits, which contains w segments that are non-overlapping. The w elements may be labeled as $(v_1, v_2, \ldots, v_w)$, where each segment is of length $\log_2(m)$. Without loss of generality, m is a power of 2. For the $i^{th}$ segment, the matrix entry at column i and row $v_i$ is set to zero. In other words, the column and row indices are identified by a specific segment of the encrypted record. For example, the column index is the segment index, and the row index is the value of the segment. The implementations are not limited to the example. Additionally, or alternatively, the matrix can be transposed where the row and column indices are applied accordingly.

Returning to FIG. 1A, when user device 101 receives the doubly encrypted data records $\{\{(H(x_j)^a)^b\}$ and the matrix filter, the user device 101 may query whether the encrypted record $H(x_j)^b$ is inside the encrypted data records $\{H(y_i)^b\}$, $j=1, \ldots, n$ on server computer 103. User device 101 may perform an unblind operation on the doubly encrypted data records $\{\{(H(x_j)^a)^b\}$ to generate $\{\{(H(x_j)^a)^b\}^{a^{-1}}$ so that $\{(H(x_j)^a)^b\}$ can be decrypted to provide a set of individual encrypted records $H(x_j)^b$ (108).

User device 101 may then query the matrix filter for an indication of whether or not each encrypted record $H(x_j)^b$ is present in the encrypted data records $\{H(y_i)^b\}$, $j=1, \ldots, $ non server computer 103 (109). For example, the user device may divide the numerical value of $H(x_j)^b$ into w segments and verify the corresponding row and column indices for each segment of $H(x_j)^b$ in the matrix filter is set to 0.

In some implementations, the matrix D is generated with parameters m and w selected to discern with sufficient confidence level whether each data record is contained in the larger data set. For example, when the number of records to be inserted into the matrix is n, then the probability that a position in any column of the matrix D is 1 is defined by:

$$p = \left(1 - \frac{1}{m}\right)^n. \tag{1}$$

The probability of $|D_1[v[1]]\|D_2[v[2]]\| \ldots \|D_w[v[w]]|$ including k-bit 1 is then:

$$\binom{w}{k} p^k (1-p)^{w-k}. \tag{2}$$

For a record to be outside the set, $|D_1[v[1]]\|D_2[v[2]]\| \ldots \|D_w[v[w]]|$ contain at least one bit 1 with a non-negligible probability. Therefore, the following formula applies, in order to meet the condition of the non-negligible probability:

$$n_q \times \binom{w}{0} p^0 (1-p)^{w-0} = n_q \times (1-p)^w \le negl(\sigma). \tag{3}$$

Here, ng is the number of records that needs to be tested if the records are in the set. As illustrated in FIG. 1A, the query step 109 yields a result for each record on the user device (110). The results can be binary, but with sufficient probability to provide answers with high confidence in real-time. Similar techniques as described above can be applied to other probabilistic data structures such as Bloom filters. For example, according to the Bloom filter parameters, when the false positive rate is 0.001 and the inserted elements are 3200, the bloom filter size is 46009 bits. Under the same false positive rate and inserted number, the matrix filter size is $m \times w = 4600 \times 10 = 46000$ bits. Thus, the matrix filter's space occupancy overhead (and hence communication overhead) is similar to that of the bloom filter under the same conditions. While the absolute sizes are similar, the implementations of the present specification provide a multi-dimensional data structure in which each column can be inserted and queried independently from the rows. Such features render the multi-dimensional data structure advantageous for improving efficiency and enhancing privacy in a practical application of implementing unbalanced private set intersection protocols.

Figure 3:
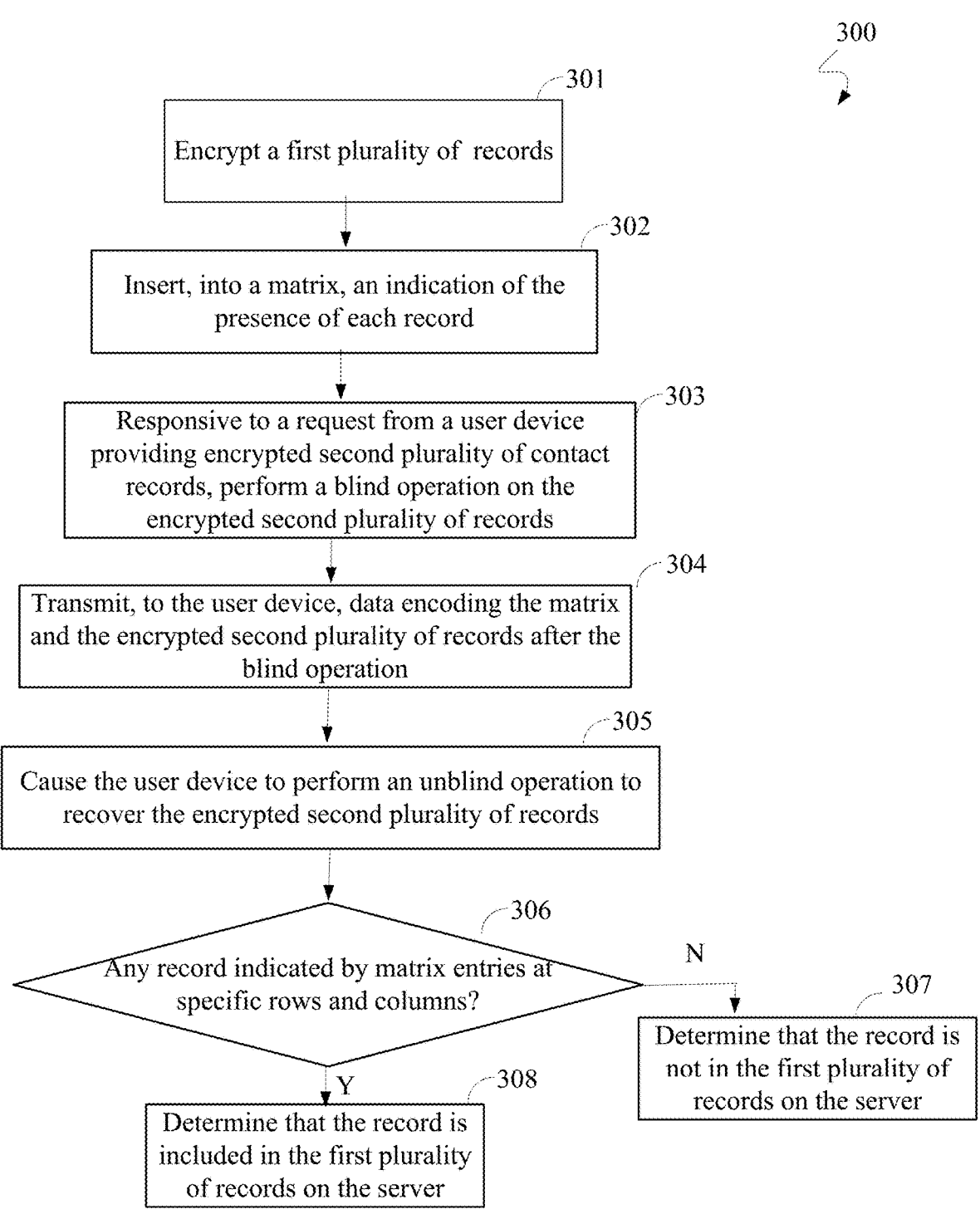
FIG. 3 illustrates a flow chart of an example process on a server computer to process data records and generate a matrix filter.

FIG. 3 illustrates a flow chart of an example process 300 for performing an unbalanced private set intersection protocol in accordance with some implementations. For convenience, the process 300 will be described as being performed by a system of one or more computers, located in one or more locations, and programmed appropriately in accordance with this specification. For example, the system can include a server computer, e.g., the server computer 103 of FIG. 1, that when appropriately programmed, can perform the process 300.

The system encrypts a first plurality of data records on the server computer (301). For example, the data records may include a set of phone records of users who signed up for service by opening an account. The records may not be limited to phone records. The records can include other forms of contact records such as email addresses, nicknames, and hashtag identifications. The encryption may apply a key generated at the server (e.g., server computer 103 in FIGS. 1A to 1B). The key can be an elliptic curve key so that the encrypted data records can be computed as a series of outputs.

The system inserts an indication of the presence of each encrypted record into a matrix filter (302). As explained above with reference to FIG. 2, the matrix for the matrix filter may be initialized to all ones (1s). For a record to be inserted into the matrix, the implementation may divide the numerical representation (e.g., bit representation) of the encrypted data record into a sequence of non-overlapping segments. In some implementations, the number of the sequential segments and the length of each segment can be selected to respectively match the number of columns and the number of rows of the matrix. For the $i^{th}$ segment, the implementations may set the matrix entry at column number i and row number $v_i$ as 0. Here, $v_i$ refers to the numerical value of the $i^{th}$ segment of the encrypted data record. The implementations may judiciously select the number of rows and columns of the matrix, as well as the bit length of the encrypted data records, to maintain the ability for the matrix filter to correctly predict whether a data record is within a larger data set (e.g., with a false negative rate below a threshold level).

Responsive to a request from a user device providing encrypted second collection of records from a user device, the system performs a blind operation on the second collection of encrypted records (303). The blind operation may encrypt the encrypted second plurality of records from a user device using a server key, which can also be an elliptic curve-based key.

In some implementations, the user device (user device 101 in FIGS. 1A and 1B) may leverage bucketization and transmit a hash prefix and the encrypted data records from a corresponding bucket to the server (e.g., server computer 103 in FIGS. 1A and 1B). In one example, the user device may insert all records of the user into buckets according to the hash prefix of the encrypted data records, and then insert dummy records into each bucket to achieve buckets with equal number of records being held. The user device may then transmit the encrypted results $\{H(x_j)^a\}$ in a bucket and the corresponding prefix for the bucket to the server. Because the prefix is already hashed and each bucket is equal in size, there is no leakage in client information on the user device in this example. In another example that is without the addition of dummy records, the user device can directly transmit the encrypted results $\{H(x_j)^a\}$ and the corresponding hash prefix to the server. In this scenario, the server may learn which bucket(s) are of interest to the client because the buckets are uneven in size and therefore distinguishable. However, given the size of the prefix, the server can only learn as much as whether one client contact belongs to one of millions of contact records in the bucket.

At block 304, the server may transmit, to the user device, data encoding the matrix and the doubly encrypted second plurality of data records. Here, after the blind operation on the server, the client-encrypted second plurality of data records are now encrypted using the server key, and hence doubly encrypted.

At block 305, the user device, upon receipt of the data encoding the matrix and the doubly encrypted second plurality of data records, performs an unblind operation to recover the client-encrypted second plurality of data records. The user device may then search the matrix filter for indication of the presence of any of the client-encrypted second plurality of data records (306). As explained above with reference to FIGS. 1A, 1B, and 2, for a given record to be outside the data set on the server, the matrix entries at corresponding row and column coordinates for segments of the encrypted data record need to contain at least one bit 1. The size of the matrix as well as the bit length of the encryption results are judiciously selected so that the probability of a false negative is within a pre-determined threshold. Here, in response to determining there is no bit 1 in the corresponding matrix entries, the user device can determine that the data record is included in the first plurality of records on the server (308). In response to determining that there is at least one bit 1 in the corresponding matrix entries, the user device can determine that the data record on the user device is not included in the first plurality of records on the server (307).

Figure 4:
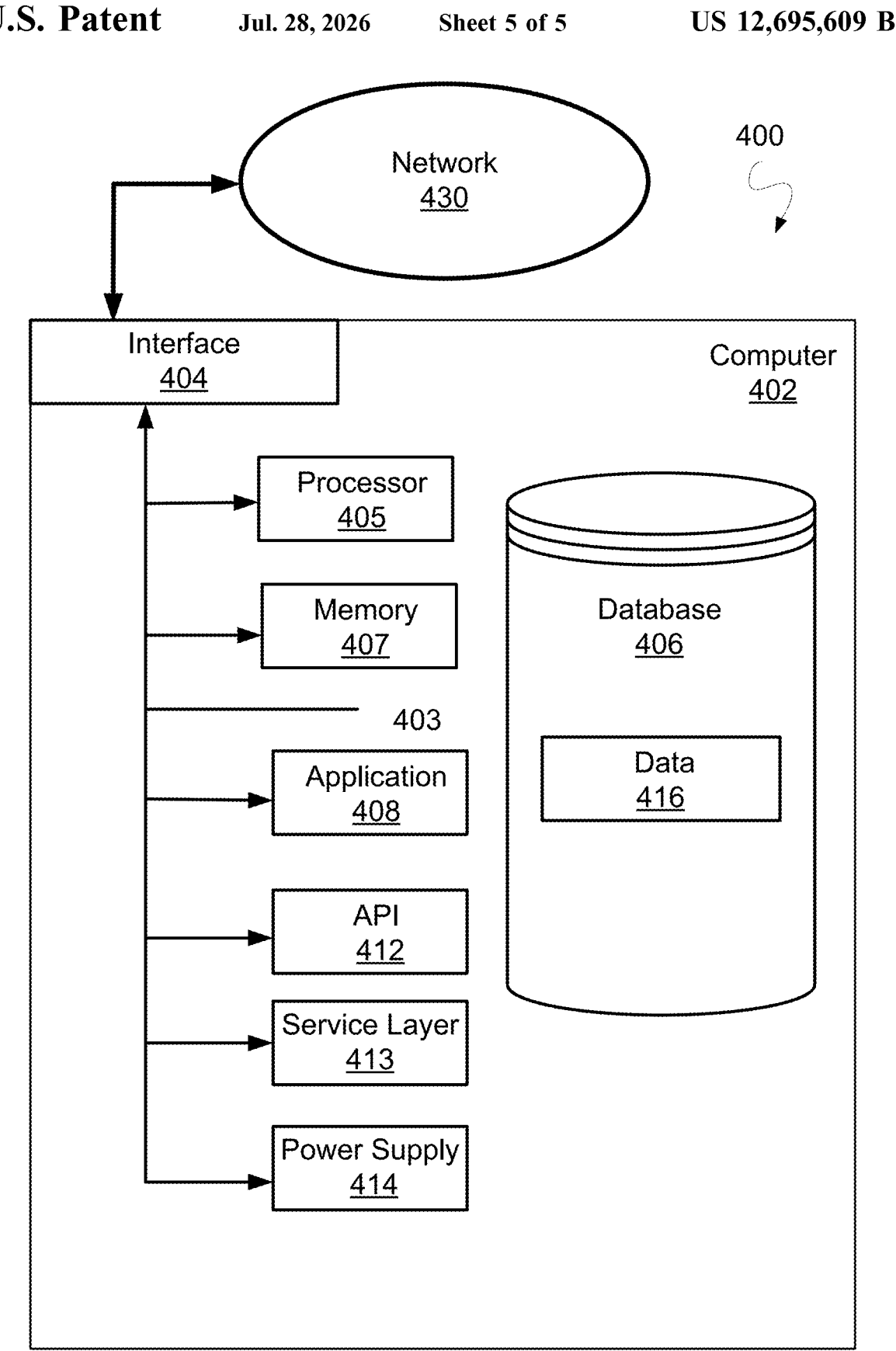
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described data 416 including, for example, records held at the server computer 103 that encode contact information of users who signed up for the service.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time,"

or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer readable media for storing computer program instructions and data can include all forms of media and memory devices, magnetic devices, magneto optical disks, and optical memory device. Memory devices include semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), compact disc read only memory (CD-ROM), DVD+/-R, DVD-RAM, DVD-ROM, high-density digital video disc (HD-DVD), and BLU-RAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
generating, at one or more first devices, a first plurality of encrypted records by encrypting a first plurality of original records using a cryptographic function driven by a first key generated at the one or more first devices, wherein each encrypted record comprises a sequence of segments;
creating a matrix sized to have a first number of rows and a second number of columns, wherein each matrix element in the matrix is a binary entry and initialized as unity;
inserting the first plurality of encrypted records into the matrix, wherein inserting one of the encrypted records comprises:
for each segment of the encrypted record,
identifying a corresponding position in the matrix based on, at least in part, a numerical value of the segment of the encrypted record, and
setting a matrix element at the corresponding position in the matrix to zero;
responsive to a request from a second device providing a second plurality of encrypted records encrypted by the second device using the cryptographic function driven by a second key generated at the second device, encrypting the second plurality of encrypted records using the cryptographic function driven by the first key to create a second plurality of doubly encrypted records; and
transmitting the second plurality of doubly encrypted records and the matrix to the second device, the second device using the second plurality of doubly encrypted records and the matrix to determine whether at least one of the second plurality of encrypted records is included in the first plurality of encrypted records.

2. The computer-implemented method of claim 1, further comprising:

categorizing the first plurality of encrypted records according to prefixes of the first plurality of original records into a set of groups, each group from the set of groups holding encrypted records whose original records share a prefix; and responsive to the request from the second device further providing a query prefix, identifying a group from the set of groups holding encrypted records whose original records share the query prefix, wherein the encrypted records of the group are inserted into the matrix for transmitting to the second device.

3. The computer-implemented method of claim 2, wherein the prefix is sized to be at least one bit in length.

4. The computer-implemented method of claim 1, wherein the transmitting causes the second device to determine whether at least one encrypted record from the second plurality of encrypted records is included in the first plurality of encrypted records by:

for each segment of the at least one encrypted record, identifying a corresponding position in the matrix based on, at least in part, a numerical value of the segment, and determining whether the matrix element at the corresponding position is valued at zero; and responsive to determining that all matrix elements at corresponding positions for the segments of the at least one encrypted record have a value of zero, determining that the at least one encrypted record from the second plurality of encrypted records is included in the first plurality of encrypted records.

5. The computer-implemented method of claim 4, wherein the matrix is configured sufficiently large such that a probability of one or more of the matrix elements valued to be non-zero is below a pre-determined threshold.

6. The computer-implemented method of claim 1, wherein the cryptographic function comprises a cryptographically secure oblivious pseudorandom function (OPRF) based on elliptic curve cryptography, wherein said encrypting generates, for each original record, a corresponding encrypted record at a bit length that is configurable, and wherein each original record encodes phone contact information.

7. The computer-implemented method of claim 6, wherein the bit length is configured at a size determined by a product of the first number and the second number.

8. The computer-implemented method of claim 7, wherein the first number and the second number are adjustable to accommodate a size of the first plurality of encrypted records, and wherein the second plurality of encrypted records are substantially smaller in number than the first plurality of encrypted records.

9. The computer-implemented method of claim 7, wherein the sequence of segments for each encrypted record corresponds to a number of segments that equals to the second number, wherein each segment has a bit length determined by the first number, and wherein each segment corresponds to a row in the matrix.

10. The computer-implemented method of claim 9, wherein, when inserting an encrypted record comprising the sequence of segments, the corresponding position in the matrix for the matrix element is identified by: a row index that corresponds to a sequential index in the sequence of segments for the encrypted record, and a column index the corresponds to a numerical value of a segment at the sequential index in the sequence of segments.

11. One or more non-transitory computer-readable storage media encoded with instructions that, when executed by one or more computers, cause the one or more computers to perform operations comprising:

generating a first plurality of encrypted records by encrypting a first plurality of original records using a cryptographic function driven by a first key generated at the one or more computers, wherein each encrypted record comprises a sequence of segments;

creating a matrix sized to have a first number of rows and a second number of columns, wherein each matrix element in the matrix is a binary entry and initialized as unity;

inserting the first plurality of encrypted records into the matrix, wherein inserting one of the encrypted records comprises:

for each segment of the encrypted record, identifying a corresponding position in the matrix based on, at least in part, a numerical value of the segment of the encrypted record, and setting a matrix element at the corresponding position in the matrix to zero;

responsive to a request from a remote device providing a second plurality of encrypted records encrypted by the remote device using the cryptographic function driven by a second key generated at the remote device, encrypting the second plurality of encrypted records using the cryptographic function driven by the first key; and transmitting the second plurality of doubly encrypted records and the matrix to the remote device for the remote device to determine whether at least one of the second plurality of encrypted records is included in the first plurality of encrypted records.

12. The one or more non-transitory computer-readable storage media of claim 11, wherein the operations further comprise:

categorizing the first plurality of encrypted records according to prefixes of the first plurality of original records into a set of groups, each group from the set of groups holding encrypted records whose original records share a prefix; and responsive to the request from the remote device further providing a query prefix, identifying a group from the set of groups holding encrypted records whose original records share the query prefix, wherein the encrypted records of the group are inserted into the matrix for transmitting to the remote device.

13. The one or more non-transitory computer-readable storage media of claim 11, wherein the transmitting causes the remote device to determine whether at least one encrypted record from the second plurality of encrypted records is included in the first plurality of encrypted records by:

for each segment of the at least one encrypted record, identifying a corresponding position in the matrix based on, at least in part, a numerical value of the segment of the encrypted record, and determining whether the matrix element at the corresponding position is valued at zero; and responsive to determining that all matrix elements at corresponding positions for the segments of the at least one encrypted record have a value of zero, determining that the at least one encrypted record from the second plurality of encrypted records is included in the first plurality of encrypted records.

14. The one or more non-transitory computer-readable storage media of claim 13, wherein the matrix is configured sufficiently large such that a probability of one or more of the matrix elements valued to be non-zero is below a predetermined threshold.

15. The one or more non-transitory computer-readable storage media of claim 11, wherein the cryptographic function comprises a cryptographically secure oblivious pseudorandom function (OPRF) based on elliptic curve cryptography, wherein said encrypting generates, for each original record, a corresponding encrypted record at a bit length that is configurable, and wherein each original record encodes phone contact information.

16. The one or more non-transitory computer-readable storage media of claim 15, wherein the bit length is configured at a size determined by a product of the first number and the second number.

17. The one or more non-transitory computer-readable storage media of claim 16, wherein the first number and the second number are adjustable to accommodate a size of the first plurality of encrypted records, and wherein the second plurality of encrypted records are substantially smaller in number than the first plurality of encrypted records.

18. The one or more non-transitory computer-readable storage media of claim 16, wherein the sequence of segments for each encrypted record corresponds to a number of segments that equals to the second number, wherein each segment has a bit length determined by the first number, and wherein each segment corresponds to a row in the matrix.

19. The one or more non-transitory computer-readable storage media of claim 18, wherein, when inserting an encrypted record comprising the sequence of segments, the corresponding position in the matrix is identified by: a row index that corresponds to a sequential index in the sequence of segments for the encrypted record, and a column index the corresponds to a numerical value of a segment at the sequential index in the sequence of segments.

20. A computer system comprising one or more hardware computer processors configured to perform operations of:

generating a first plurality of encrypted records by encrypting a first plurality of original records using a cryptographic function driven by a first key, wherein each encrypted record comprises a sequence of segments;

creating a matrix sized to have a first number of rows and a second number of columns, wherein each matrix element in the matrix is a binary entry and initialized as unity;

inserting the first plurality of encrypted records into the matrix, wherein inserting one of the encrypted records comprises:

for each segment of the encrypted record, identifying a corresponding position in the matrix based on, at least in part, a numerical value of the segment of the encrypted record, and setting a matrix element at the corresponding position in the matrix to zero;

responsive to a request from a remote device providing a second plurality of encrypted records encrypted by the remote device using the cryptographic function driven by a second key generated at the remote device, encrypting the second plurality of encrypted records using the cryptographic function driven by the first key to generate a second plurality of doubly encrypted records; and transmitting the second plurality of doubly encrypted records and the matrix to the remote device for the remote device to determine whether at least one of the second plurality of encrypted records is included in the first plurality of encrypted records.

* * * * *